June 6, 1961 E. M. WILLIAMS ET AL 2,987,609
SPARK MACHINING APPARATUS
Filed March 11, 1957 5 Sheets-Sheet 1

INVENTORS
EVERARD M. WILLIAMS
CECIL PAUL PORTERFIELD
by: Carlson, Pitzner, Hubbard & Wolfe
ATTYS.

INVENTORS
EVERARD M. WILLIAMS
CECIL PAUL PORTERFIELD
by: Carlson, Pitzner, Hubbard & Wolfe
ATTYS.

June 6, 1961  E. M. WILLIAMS ET AL  2,987,609
SPARK MACHINING APPARATUS
Filed March 11, 1957  5 Sheets-Sheet 4

INVENTORS
EVERARD M. WILLIAMS
CECIL PAUL PORTERFIELD
by: Carlson, Pitzner, Hubbard & Wolfe
ATTYS June 6, 1961  E. M. WILLIAMS ET AL  2,987,609
SPARK MACHINING APPARATUS Filed March 11, 1957  5 Sheets-Sheet 5

Fig.13  $E_{SOURCE}$

Fig.20  $E_{IGN. 180A}$

Fig.21  $E_{IGN. 180B}$

INVENTORS
EVERARD M. WILLIAMS
CECIL PAUL PORTERFIELD
by: Carlson, Pitzner, Hubbard & Wolfe
ATTYS.

United States Patent Office 2,987,609
Patented June 6, 1961

2,987,609
SPARK MACHINING APPARATUS
Everard M. Williams and Cecil Paul Porterfield, Pittsburgh, Pa., assignors to Firth Sterling Inc., Pittsburgh, Pa., a corporation of Pennsylvania
Filed Mar. 11, 1957, Ser. No. 643,691
13 Claims. (Cl. 219—69)

The present invention relates to the art of spark machining, often referred to as electro-erosion, in which particles of the material of a conductive workpiece are dislodged therefrom by overvoltage-initiated time-spaced spark discharges through a dielectric medium in a spark gap defined between an electrode-tool and the conductive workpiece.

It is a general objective of the present invention to provide a spark machining device embodying simple circuitry which can be readily incorporated in machines for performing drilling, broaching, grinding, and allied operations and which permits of economical manufacture. It will be understood that the use of such terms as drilling, broaching, grinding, and the like, are employed only because of the similarity of ultimate result upon a workpiece attained from the spark machining operation thereon, because the electrode-tool in the practice of this art does not necessarily engage the work to effect chip removal therefrom as is the case with conventional machining.

It is a further object of the present invention to provide a device of the foregoing general character by means of which the material of the workpiece can be removed at a relatively high rate for roughing or shaping and also by means of which material removal can be effected at a relatively low rate as for finishing, dressing or sharpening. A related and more particular object of the present invention lies in the provision for effecting removal of the material of the workpiece at a relatively high rate through the utilization of repeated, high-energy spark discharges at a relatively low repetition rate and for effecting material removal at a comparatively low rate through the utilization of repeated, low-energy spark discharges at a relatively high repetition rate.

It is another object of the invention to provide in a spark machining apparatus for cutting a workpiece by repeated, overvoltage-initiated spark discharges across a gap between the workpiece and an electrode-tool adjacent thereto, a spark discharge repetition rate which is directly related to the supply frequency for the apparatus.

Yet another and more specific object is to provide in an apparatus of the foregoing general character a spark-discharge initiating circuit including a capacitive storage element and an alternating current resonant charging source therefor and to provide a complementary additional spark-discharge initiating circuit including a second capacitive storage element which utilizes the aforesaid source and capacitive storage element as a substantially constant supply source for charging the second capacitive storage element.

The objects of the invention thus generally set forth together with other objects and ancillary advantages are attained by the construction and arrangement shown by way of illustration in the accompanying drawings, in which:

FIGS. 4–9 are wave form representations appearing at various points in the circuit illustrated in FIG. 3 with the values along the horizontal or time axis expressed in terms of electrical degrees. In FIG. 4 three wave forms are shown: A voltage wave form for the capacitive storage means 70 labeled $E_{70}$; a current wave form for the capacitive storage means labeled $I_{70}$; and for purposes of comparison, a voltage wave form representative of a full wave rectified voltage labeled $E_{Source}$.

FIG. 6 is a representative of the voltage wave form applied to the capacitor of the second stage of the keying circuit labled $E_{99}$.

FIG. 7 is the voltage wave form applied to the resistor that follows the last stage in the keying circuit and is labeled $E_{102}$.

FIG. 8 is representative of the voltage wave form applied to the rectifier bridge of the keyer circuit and is labeled $E_{100}$.

FIGS. 7A–9A are voltage wave forms corresponding respectively to FIGS. 7–9 and are representative of a single positive voltage pulse in relation to time expressed in microseconds.

FIGS. 13–21 are wave form representations at various points in the circuit illustrated in FIG. 12 in relation to time expressed in electrical degrees. FIG. 13 is representative of the source voltage and is labeled $E_{Source}$.

While the invention is susceptible of various modifications and alternative constructions there is shown in the drawings and will herein be described in detail certain preferred embodiments. It will be understood, however, that it is not intended to limit the invention peculiarly to such embodiments. On the contrary, it is intended to cover all modifications and alternative constructions falling within the spirit and scope of the invention as expressed in the appended claims.

In spark machining the cutting or eroding action is provided by the spark-over discharge in a spark gap defined between the closely spaced juxtaposed surfaces of a workpiece and an electrode-tool. The tool does not need to contact the workpiece nor does its own hardness affect the machining operation. The spark discharges are of very short duration and of relatively high energy content, the discharge energy being usually provided by capacitive storage means coupled across the spark gap. The spark-over discharges take place through a fluid or semisolid medium having dielectric properties which at all times fills the gap. During application of the spark discharges, minute particles of the workpiece are successively dislodged therefrom in the region opposite the electrode-tool to generate the machined contour desired for the workpiece. As the machining action progresses it is generally necessary to maintain the spacing between the workpiece and the electrode-tool substantially constant. In many instances a feed mechanism and control assembly are provided which may desirably take the form of an electrical servo-mechanism for maintaining the desired spacing, and for correcting either a short circuit operating condition or an open circuit operating condition. For many purposes, however, it is desirable that the workpiece be more freely movable with respect to the electrode-tool, preferably by manipulation of the workpiece itself. It is also desirable for some operations that the spark gap spacing be controlled with feed pressure applied manually or by simple mechanical means. Such a situation exists in performing a spark machining operation for the shaping and dressing of tools, bits and cutters.

For purposes of illustration and simplicity of description the first form of the present invention is shown and described in a form intended for incorporation in a machine for effecting a "grinding" operation. With such machines the workpiece, as noted above, may frequently comprise a conventional single point tool and the operation to be performed thereon may include both shaping the tip to a predetermined contour and then sharpening it. It will be apparent to one skilled in the art, however, that the spark machining circuitry illustrated and described can be included with equal facility in machines for performing allied metal removing operations, for example, such as a "drilling" operation and with subsequently described forms of the invention such a device is diagrammatically shown as the present invention might be used therewith.

In accordance with one aspect of the present invention there is provided means for the removal of the material of a workpiece at a relatively high rate, as would be desired in shaping a cutting tool, and also for the removal of the material of the workpiece at a relatively lower rate as would be desired in dressing or sharpening a cutting tool. Thus, the illustrative machine incorporates means for effecting relatively high energy, overvoltage-initiated, time-spaced spark discharges at a relatively low repetition rate and complementary additional means for effecting relatively low energy, overvoltage-initiated, time-spaced spark discharges at a relatively higher rate, these means each including a capacitive storage component continuously connected to an alternating current source, together with means for alternatively completing a discharge circuit for the capacitive storage components across the gap maintained between the workpiece and the electrode-tool according to the desired metal removal rate.

In carrying out one aspect of the invention and in line with the object of simplification of the included circuitry there is provided means for directly relating the repetition rate of the high energy, overvoltage-initiated spark discharges to the frequency of the alternating electrical power source for the device.

Referring more particularly to the drawings, there shown is a machine, generally designated 20, of the type generally referred to as an off-hand tool sharpener. As shown, it includes a base 22 mounting a spark machining unit 24. The unit includes a work-supporting table 25 and an electrode-tool in the form of a wheel 26. The table 25 is adapted for transverse angular adjustment with respect to the wheel 26 and for bodily movement toward and away from the wheel. For rotating the electrode-wheel 26, the spark machining unit 24 includes an electric motor 40. The motor terminates at its forward end in a spindle to which the electrode-wheel 26 is non-rotatively secured. Since the wheel 26 comprises one of the spark machining electrodes it is desirably insulated from the motor spindle.

Figure 1:
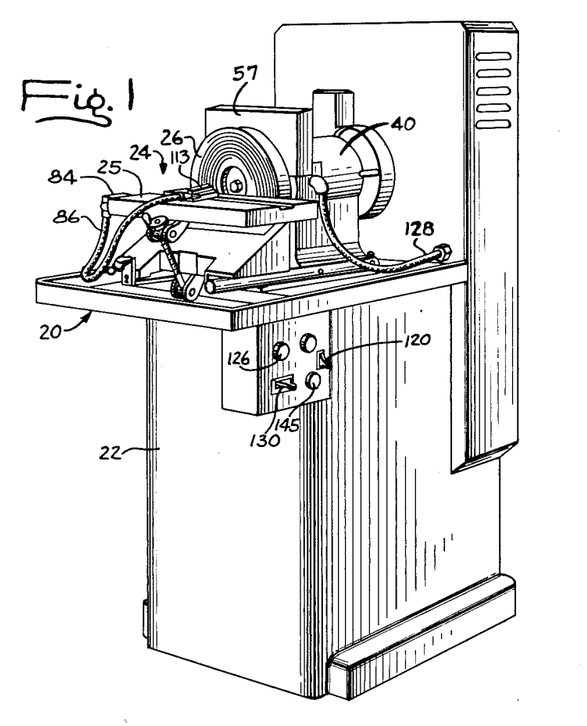
FIGURE 1 is a perspective view of a machine embodying the present invention for performing an external spark machining operation.
Figure 2:
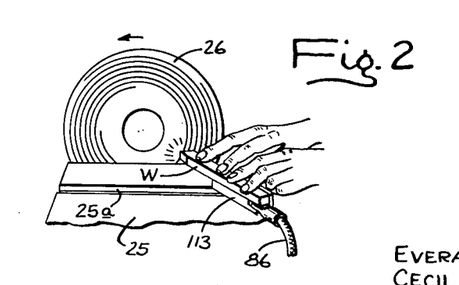
FIG. 2 is a fragmentary front perspective view of the electrode-wheel and work table and showing a workpiece in operative position thereon.
Figure 3:
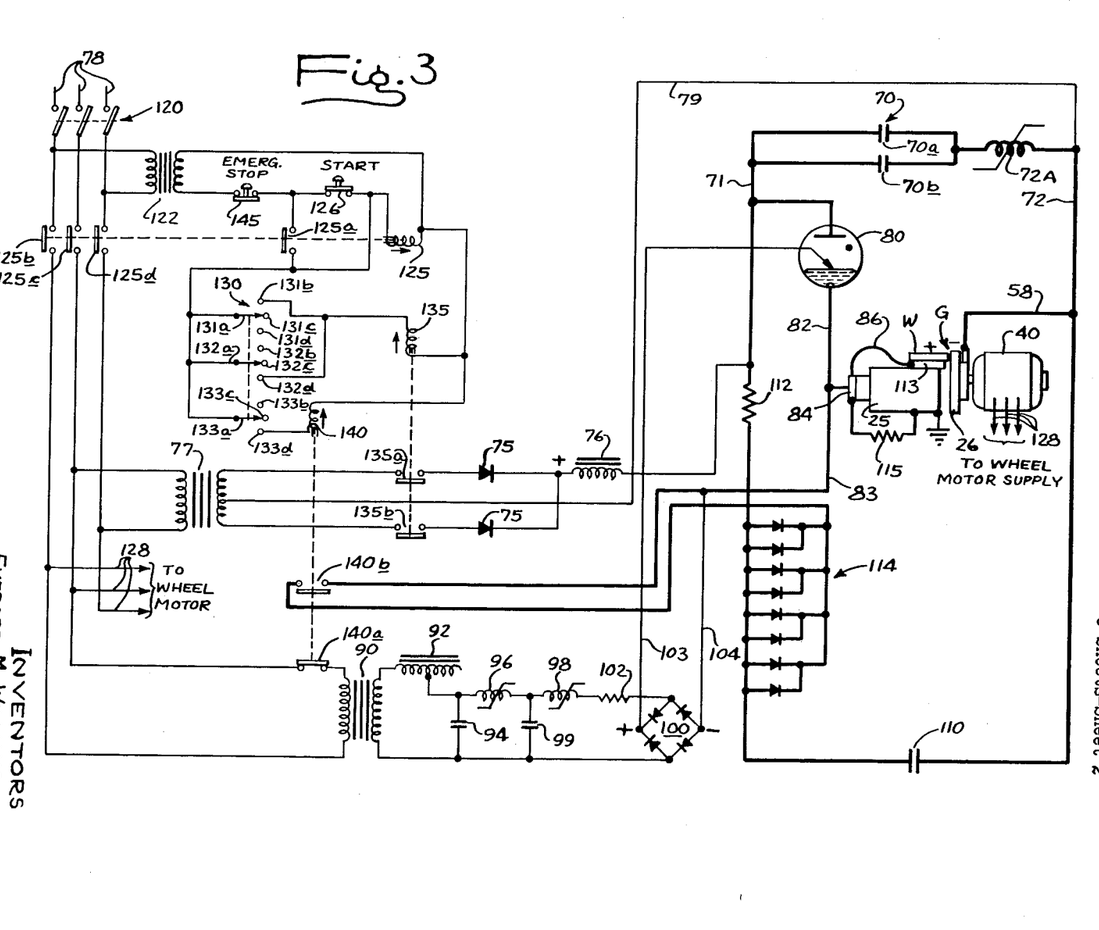
FIG. 3 is a schematic diagram of the circuitry included in the illustrative machine of the preceding figures.

Referring particularly to FIG. 3 of the drawings, there shown is a schematic circuit diagram illustrating the simplified circuitry included in the illustrative spark-cutting machine. It will be apparent from the description that while the spark machining circuits are discussed in connection with an off-hand tool sharpening machine, they readily permit of inclusion in other environments intended for performing internal as well as external machining operations. Adjacent the right-hand edge of the drawing there is diagrammatically indicated the cathodic electrode-wheel 26, which is mounted for rotation by the motor 40, in juxtaposition with the work table 25 upon which rests a workpiece W. The electrode-wheel is connected into the spark machining circuitry by way of the conductor 58 and its associated electrode structure.

A spark gap G is thus defined by the spacing between the juxtaposed surface portions of the conductive workpiece W and the electrode-wheel 26. When a sufficiently large positive voltage is applied to the workpiece W so that it acts as an anode with respect to the cathodic electrode-wheel, disruptive breakdown of the dielectric therebetween occurs. That is to say, an ionized path is briefly maintained across the gap G. The voltage required to initiate the discharge increases with increase in spark gap length. However, practical spark gap lengths are small, being usually on the order of thousandths of an inch in length. While the discharge peak current is desirably large, the discharge duration is usually less than a hundred microseconds and preferably very much less. As presently understood, the dislodging of particles from the conductive workpiece by spark action is best explained in terms of electric field force produced by the spark discharge current. It has been concluded that the current density determines the amount of material dislodged per spark discharge, and that for a given amount of energy (product of current and duration) effectiveness is increased by increasing the current to time ratio. The total material removal is the cumulative effect of a number of spark discharges and hence the repetition rate is directly involved in actual practice.

In FIG. 3 there is shown combined circuitry for effecting high energy, short duration, spark discharges across the gap G, and for effecting relatively lower energy spark discharges at a relatively higher rate across the gap G. For these purposes the illustrative device includes a relatively large capacitive storage means together with means for controlling the discharge thereof across the gap G at a relatively low repetition rate, and it also includes means providing a substantially lower storage capacity together with means for effecting discharge thereof across the gap at a relatively high repetition rate, the same charging current supply being utilized for each capacitive storage means. As shown, the relatively large capacitive storage means is provided as indicated at 70 by a capacitance of approximately 300 microfarads, and the circuit arrangement is such that the capacitor is discharged directly across the gap G. In this instance, this capacitance is achieved by the utilization of a pair of capacitors 70a and 70b connected in parallel between spark discharge mains 71 and 72.

For charging the capacitive storage means 70 an alternating current charging circuit consisting basically of a full wave, single phase rectifier feeding a charging inductance is employed. The rectifier is indicated generally at 75 and is preferably of the center-tap selenium type intended for continuous duty. The output of the rectifier is applied to an inductance 76 in such manner that unidirectional potential is supplied to the conductor 71 of the spark machining mains. The rectifier 75 is supplied from the secondary of a transformer 77, the primary winding of which is connected to the alternating power supply for the machine as represented by the 3-wire line 78. To complete the charging circuit, the spark machining main 72 is connected by conductor 79 back to the center-tap of the secondary of the transformer 77.

In order to effect the discharge of the capacitive storage means 70 directly across the gap G, a series circuit including the gap and a normally open ionizable switch means is completed across the capacitive storage means. This switch means is preferably of the low-resistance type which is closed, or rendered conductive, by ionization of an included gas or vapor initiated by an externally derived, keying voltage signal. For this purpose the illustrative device employs an ignitron 80. The ignitron 80 comprises a pool-cathode electron discharge device having therein means for initiating ionization so as to render the device conductive. The ignitron 80 has its plate connected to the conductor 71 and its cathode connected to the workpiece W. The latter connection is effected by way of a conductor 82 to an insulated terminal block 84 which is fixed with respect to the work table 25 and which serves as the terminus for a flexible conductor 86 which is connected to the workpiece W. From the other side of the gap G, the discharge path further includes the electrode-wheel 26 and the conductor 58 by means of which the wheel is connected to the conductor 72 of the spark discharge mains. After the capacitive storage means 70 is charged, in that space of time determined by the value of the inductance 76 and the particular capacitance of the storage means 70, the ignitron 80 is caused to become conductive and the capacitive storage means 70 discharges through the ignitron 80 and across the gap G. In this manner time spaced discharges of high energy are initiated.

Figure 4:
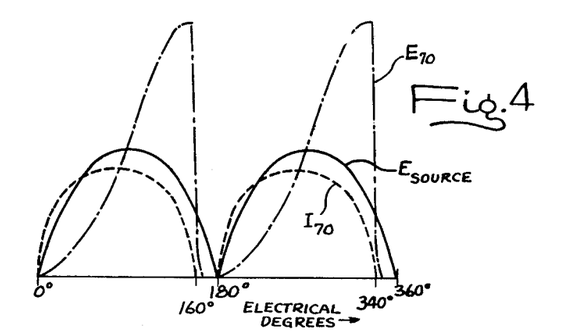

In accordance with another aspect of the present invention, means is provided for relating the repetition rate of spark discharges from the capacitive storage means 70 across the gap G to the frequency of the alternating electrical power supply to the illustrative machine. More particularly, the ignitron 80 is continuously connected to a unidirectional periodic power source and the circuit is such that the ignitron is arranged to be made conducting so as to discharge the capacitive storage means across the gap G, and to again become non-conducting prior to the arrival of the next cycle from the power source. Stated in other words, at the beginning of a cycle from the periodic power source the ignitron is maintained non-conductive so that the capacitive storage means 70 is charged; the ignitron is then made conductive to effect discharge of the capacitive storage means; and then the ignitron is allowed sufficient time to deionize so as to return to its non-conductive condition prior to the beginning of the next cycle from the periodic power source. Referring to FIGS. 3 and 4, the latter comprising a wave-form comparison of the current and voltage in various portions of the illustrative circuit, it will be seen that the output of the full wave rectifier 75 is a unidirectional periodic electromotive force comprising a series of positive half cycles of a sine wave. If the supply frequency is 60 cycles per second, then the periodic frequency of the output from the full wave rectifier 75, as shown, will be 120 c.p.s. This is designated by the voltage wave form labeled $E_{Source}$ (FIG. 4). This source voltage is applied to the charging choke 76, and through it charging of the capacitive storage means 70 is effected. The charging of the capacitive storage means 70 is indicated in FIG. 4 by the wave forms respectively designated as $E_{70}$ and $I_{70}$, which are the result of the resonant frequency of the charging choke 76 and the capacitive storage means 70. The values of inductance and capacitance of these elements are selected to effect completion of charging approximately 160° after the start of a charging cycle. It will be seen from FIG. 4 that the charging rate of the capacitive storage means 70 is influenced by the self-inductance of the charging choke 76. The charging rate increases with the increase in the source voltage but does not decrease to zero when the voltage charge equals the voltage of the source, but instead the charging choke 76 tends to prevent current change by the collapsing of its field, i.e., discharging the energy stored therein. The cumulative voltage of both the source and the stored charge as a result of the effect of the inductance of the charging choke 76 is substantially twice the source voltage. Considering the capacitance C of the capacitive storage means 70 and the voltage charge $E_c$ it may be seen that since the stored energy $$P = \frac{1}{2} C E_c^2$$

then the stored energy is thus substantially quadrupled.

Turning again to FIG. 4, it will there be seen that in order to effectively charge and discharge the capacitive storage means, the ignitron 80 is rendered conductive sufficiently in advance of the end of a particular cycle from the periodic power source so that not only is sufficient time for discharge allowed, but additionally time for the ignitron to deionize is allowed. Laboratory observation on a large number of commercially available ignitrons has demonstrated that at the energy levels here involved an ample time for ignitron deionization is about 500 microseconds. Out of an abundance of caution to accommodate even a somewhat longer deionization time if such an ignitron should be encountered, it is presently contemplated that a deionization interval of approximately 750 microseconds be allowed. Additionally, it has been found that the duration of discharge is $$\frac{1}{2F_0}$$

where $$F_0 = \frac{1}{2\pi\sqrt{LC}}$$

in which L is the inherent self-inductance found in the ignitron discharge circuit and C is the total capacitance therein. Observations utilizing various commercially available capacitors as the capacitive storage means 70 and with various forms of conductors included in the discharge circuit have shown that in the illustrative device approximately 70 microseconds, maximum, is an ample time allowance for the discharge of the capacitive storage means 70. Relating this back to the wave form diagram comprising FIG. 4, it will be seen then that it is desirable to have the ignitron rendered conductive some 800–900 microseconds before the beginning of the next positive cycle from the charging power source.

In order to render the ignitron 80 conductive a keying circuit is employed in the instant device which includes a phase shifting and peaking network. The output of the keying circuit comprises pulses of sufficient energy to place the ignitron 80 in conducting condition, and these pulses are such that there is one positive pulse for each half cycle of the supply voltage so spaced with reference to the supply voltage that they occur approximately 20 electrical degrees, i.e., approximately 900 microseconds, before each source voltage zero or crossover. Further, these pulses should also be of short duration but of high energy.

Figure 5:
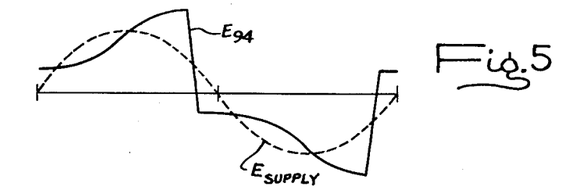
FIG. 5 shows two wave forms: The dotted line represents the supply voltage, labeled $E_{Supply}$; the solid line represents the wave form on the capacitor of the first stage of the keying circuit, labeled $E_{94}$.

As shown, the keying circuit includes a transformer 90 having its primary connected to the power source 78 and its secondary applied to a phase shifting and peaking network. The output of this network is fed to a bridge rectifier, and the output of the latter is applied between the ignitron's cathode and its igniter. More particularly, the phase shift network of the keying circuit includes an inductance or charging choke 92 and a capacitor 94. This may be termed the first stage of the keying circuit and is the pulse initiating and timing stage. The charging choke 92 together with the leakage inductance of the transformer 90 when associated with the capacitor 94 produces a voltage wave form such as that shown in FIG. 5 and labeled "$E_{94}$." For purposes of comparison there is also included in FIG. 5 one cycle of supply voltage. From these two wave forms it will be seen that from the first stage of the keying circuit there results a rapid voltage change in a negative direction substantially after the line voltage has begun to change in that direction (at 90 electrical degrees), and also there is produced a rapid positive voltage change substantially after the supply voltage has begun its positive swing (at 270 electrical degrees).

The second and third stages of the illustrative keying circuit consist of saturable inductances 96 and 98, a capacitor 99, a rectifier bridge 100 and a resistor 102. These two stages may be aptly termed pulse compression stages and are necessary to produce the aforementioned short, high energy pulses. It will be apparent that the rectifier bridge functions to make all the pulses positive for application to the ignitron. At this point it might be noted that the operation of the circuit may be entirely described by describing its operation for a single pulse. The fact that every other pulse is of opposite polarity causes no difficulty since all voltages are symmetrical about zero until application to the rectifier bridge 100.

The voltage which appears across the isolation transformer 90 is in exact time phase relation with the supply voltage. This voltage is impressed upon the series combination of the linear inductance 92 and the capacitor 94 whose values are chosen to cause "switching" of the saturable inductance 96 at the desired point before supply voltage zero. Preferably the charging inductance 92 is provided with a series of taps to permit compensation for various values of leakage inductance that may be encountered in the transformer 90. Initially the saturable inductance 96 presents a high impedance and the voltage across the capacitor 94 will also appear across it. But when the point that the saturation flux density of the inductance 96 is reached and it saturates, it presents an impedance which is largely the resistance of its winding. Since this is exceedingly small, effectively the capacitor 94 is short-circuited thereby permitting rapid discharge thereof into the succeeding stage of the circuit. For a given core and winding of the inductance 96 its saturation volt-time integral is fixed so that the point in the line voltage cycle at which the inductance 96 saturates may be varied simply by varying the voltage on the capacitor 94. Thus, if the voltage on the capacitor 94 is low, it will take a longer time for the inductance 96 to saturate than if it were high. Since, as has hereinbefore been noted, it is desirable that "switching" occur at a predetermined point before line voltage zero so as to initiate proper timed firing of the ignitron 80, it is necessary but to adjust the voltage time integral of the voltage across the capacitor 94. In order to avoid unwanted transients, however, it is desirable that the inductance 96 saturate when the current in the charging choke 92 has ceased to flow. Such a condition is also advantageous from another standpoint since when no current flows in the charging choke 92, then the capacitor 94 has maximum charge and thus maximum energy. It will be apparent upon reference to FIG. 5 that the initiation of a pulse in the keying circuit is denoted by the sharp drops or rises in voltage which can be seen to occur a substantial time prior to line voltage zero or crossover.

The second stage of the keying circuit is what may be termed a pulse compression stage. When the inductance 96 saturates, its impedance drops to a very low value causing the charge on the capacitor 94 to flow to the capacitor 99. Since the saturated inductance of the reactor 96 is very low, the oscillation frequency of the combination of the inductance 96, capacitance 94 and capacitance 99 is very high thus causing the voltage on the capacitor 99 to rise sharply. Thus to the pulse which is to progress down the keying circuit a much steeper rise is imparted. Initially the inductance 98 is unsaturated so that at the beginning of the charging of the capacitor 99 the inductance 98 does not load the capacitor 99. When the volt-time integral of the voltage on the capacitor 99 reaches the saturation value of the saturable inductance 98, however, the inductance 98 saturates. When this occurs its impedance drops to an exceedingly low value with the result that the capacitor 99 is discharged into the resistor 102 and the rectifier bridge 100. As a result there is an even steeper pulse rise effected by the second stage, and further its duration is much reduced by the quick saturation of the saturable inductance 98.

Figures 6, 7, 7A, 8, 8A:
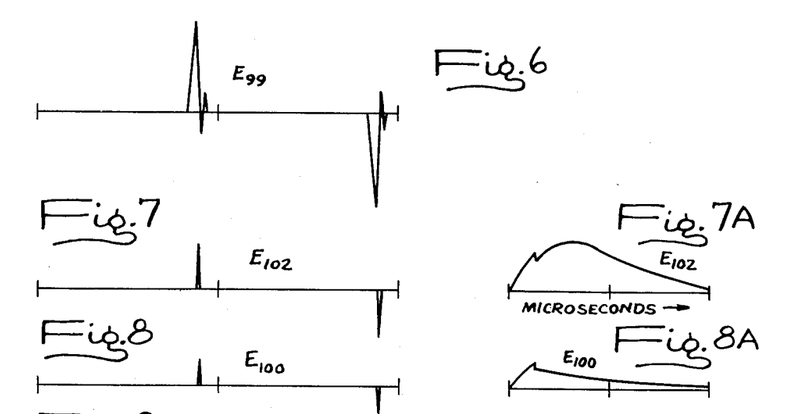
Figure 9:
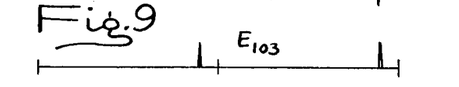
FIG. 9 is representative of the voltage wave form of the output from the rectifier bridge and is labeled $E_{103}$.
Figure 9A:
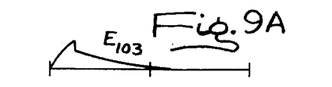

For purposes of graphic representation of what happens as the pulse proceeds along from stage to stage, FIGS. 6, 7, 8 and 9 have been included in the drawings. FIG. 6 is a voltage wave form, labeled $E_{99}$, appearing across the capacitor 99. FIG. 7 shows the voltage wave form, labeled $E_{102}$, as applied to the resistor 102. FIG. 8 shows the voltage wave form, labeled $E_{100}$, applied to the rectifier bridge 100, and FIG. 9 shows the voltage wave form, labeled $E_{103}$, of the output of the rectifier bridge 100. In each of FIGS. 5–9 inclusive, the voltage wave forms are depicted in electrical degrees. These voltage wave forms may be expanded so as to relate them to duration time, that is to say they may be shown on a scale representative of microseconds, as distinguished from electrical degrees, and for this purpose FIGS. 7A, 8A and 9A have been included in the drawings, placed side by side with respect to FIGS. 7, 8 and 9, to show the duration and form of one positive pulse that proceeds down the keying network and is ultimately applied to the ignitron. In FIGS. 7A, 8A and 9A the elapsed time when the keying network output voltage is zero has been omitted.

The resistor 102 is inserted in the output stage of the keying circuit for the practical purpose of allowing the keying circuit to work into a wider range of igniter impedances without undesirable transients occurring. Because this type of keying circuit has been found, as a practical matter, to be somewhat sensitive to load impedance this precaution of including the resistor 102 eliminates undesired keying. The resistor 102 may therefore be termed an isolation resistor and may be aptly said to provide impedance stabilization.

The output of the rectifier bridge is connected by leads 103 and 104 between the cathode and the igniter of the ignitron 80. That is to say, the negative terminal of the bridge 100 is connected by the leads 104 and 82 to the igniter cathode, and the positive terminal of the bridge is connected to the igniter of the ignitron 80 by means of the lead 103.

When an energy pulse is thus applied between the igniter and the cathode of the ignitron 80, the ignitron is rendered conductive and thus completes the discharge path for the capacitive storage means 70 to the gap G. Referring again to FIG. 4, it will be seen that there is a rapid drop in the voltage on the capacitive storage means 70 as discharge of the capacitive storage means across the gap G is effected. As hereinbefore noted, the time for discharge of the capacitive storage means 70 is on the order of 70 microseconds maximum. Thereafter it will be appreciated there is substantially no voltage applied across the ignitron with the result that there is nothing to maintain ignitron ionization. Under these conditions deionization takes place within the ignitron and by allowing sufficient time to elapse the ignitron again becomes non-conductive. The ignitron 80 will remain in this non-conductive condition, then until the next positive pulse appears from the keying circuit between its igniter and cathode. This, for example, may be some 160 electrical degrees later, which amounts to something over 8300 microseconds later when translated into actual time, during which time the capacitive storage means 70 is again charged and conditioned for discharge for the next succeeding spark.

From the foregoing it will be appreciated that since the operation of the spark initiating circuit which includes the capacitive storage means 70 and the initiation of the pulse in the keyer circuit to render the ignitron 80 conductive is directly related to the power supply frequency, the repetition rate of the spark discharges across the gap G as derived from this spark initiating circuit is also directly related to the supply frequency for the machine. Since the power in the discharge is equal to one-half the capacitance in the discharge circuit multiplied by the square of the voltage therein, then it will be apparent that exceedingly high energy spark discharges are applied across the gap G at a relatively low repetition rate so as to effect a relatively high rate of removal of material of the workpiece.

Figures 10, 10A, 12:
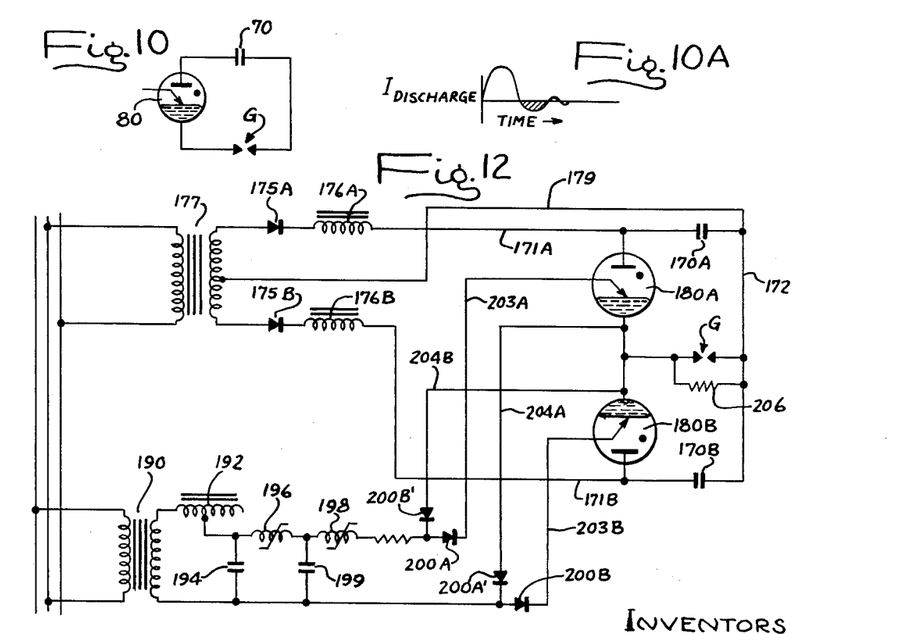
FIG. 10 is a simplified schematic representation of the discharge circuit for the capacitive storage means for the high energy discharge operative condition.
FIG. 10A is a wave form diagram of current against time in the discharge circuit depicted in FIG. 16.
FIG. 12 is a simplified schematic circuit diagram of still another modified high-energy spark-machining circuit.

As can be seen in FIG. 10, which comprises a greatly simplified schematic representation of the discharge circuit for the capacitive storage means 70, when the ignitron 80 is made conductive the capacitive storage means 70 is suddenly discharged across the gap G. Even though considerable attention may be paid to maintaining short lead lengths, there is nevertheless some distributed inductance inherent in the discharge circuit. With the sudden discharge of the relatively large capacitive storage means 70 there is a resulting current flow which is very large. Since there is some inductance L in the circuit the energy momentarily stored in the circuit is by no means negligible. Thus, when the capacitive storage means 70 is suddenly discharged, it is discharged into a series LC circuit and a transient oscillatory condition can be expected. This condition is represented by the current versus time curve labeled $I_{Discharge}$ shown in FIG. 10A. It will there be noted that the first "half cycle" is "positive." This is as it should be for desirably the workpiece W for spark machining is positive with respect to the electrode-wheel. However, there follows a negative "tail" or half cycle. This negative "tail" indicates that there tends to be a polarity reversal and current flow in an opposite direction to that of normal charging current flow to the capacitive storage means 70. As a result when the next cycle of charging current from the rectifier 75 and charging inductance 76 begins, charging of the capacitive storage means 70 tends to start from a point somewhat lower than that for the first or initial charging cycle, and the overall charge effected on the capacitive storage means 70 tends to be greater than twice the voltage from the rectified alternating supply and the charging inductance 76. This additional charge it will be understood is the result of the inductive voltage drop in the discharge path of the capacitive storage means 70 and may be expressed as $$e = L\frac{di}{dt}$$

where L is the inherent or distributed inductance in the discharge path. It might be noted that laboratory tests utilizing the circuit shown in FIG. 3 have shown that the 300 microfarad capacitive storage element 70 is charged to an average potential of 365 volts from an alternating 115 volt supply from the secondary of the transformer 77, with this arrangement and with the keying circuit arranged to fire the ignitron 80 at approximately 160 electrical degrees after supply voltage zero. In an apparatus such as the illustrative offhand tool sharpener, material was found to be removed from a workpiece at the rate of .0082 cubic inch per minute.

It will be recalled from the preceding discussion of the ignitron 80 that a certain amount of time is required for its deionization. If the reverse transient oscillatory voltage, $$e = L\frac{di}{dt}$$

were to be manifested before sufficient deionization of the ignitron had taken place and were to be properly phased with respect to the voltages across the capacitive storage means 70 and 110, these voltages could add together and result in a voltage being impressed across the ignitron 80 at the very time it is desired to achieve deionization. It will be apparent that this would at least delay deionization, and it is possible that it might cause detrimental reverse current conduction through the ignitron.

To preclude the occurrence of this condition, a saturable reactor 72A has been included in the line 72 which completes the discharge path for the capacitive storage means 70. The saturable reactor effectively increases the time required for voltage to build up to a value which might result in reverse ignitron conduction. The saturable reactor 72A appears, when unsaturated, as a high impedance in the discharge circuit during the start of a discharge of the capacitive storage means 70 and also during that period of time at the end of a discharge when the voltage across the ignitron 80 tends to reverse as a result of the induced voltage $$e = L\frac{di}{dt}$$

manifested in the leads of the discharge circuit. The value of the inductance when saturated is sufficiently low to have a negligible effect on the peak current in the discharge energy pulse. Thus the saturable reactor 72A provides sufficient unsaturated inductance to preclude reverse ignitron conduction and therefore effectively extends the useful life of the ignitron. It will also be apparent that the utilization of the saturable reactor 72A permits the use of more closely time-spaced spark discharges so as to attain higher spark machining rates since by its use a lesser time for ignitron deionization need be allowed.

The negative "tail" or half cycle of the current in the discharge circuit results not only in a reverse current flow but also a polarity reversal of the electrode-tool and the workpiece. From FIG. 10 it will be seen that while the majority of the energy is transferred during the first or positive half cycle, there is a considerable amount of energy embraced by the curve in the succeeding negative half cycle. This in an offhand tool sharpener such as the illustrative device is not serious so long as adequate provision is made in the choice of circuit components to accommodate the peak inverse voltages involved, particular attention being paid to the inverse voltage rating of the charging rectifier 75. As a matter of practice, as demonstrated above, by not compensating therefor additional spark discharge energy is made available, and a device incorporating such a spark machining circuit permits of somewhat more economical construction. However, in other applications as, for example, where the instant circuit is incorporated in an automatic internal spark discharge machining apparatus such as a "drilling" unit, it may well be preferred to hold the energy transfer per discharge to a lower predetermined level and to include in the discharge circuit means to absorb or dissipate this reversely applied discharge circuit energy so as to minimize electrode-tool erosion.

Figure 11:
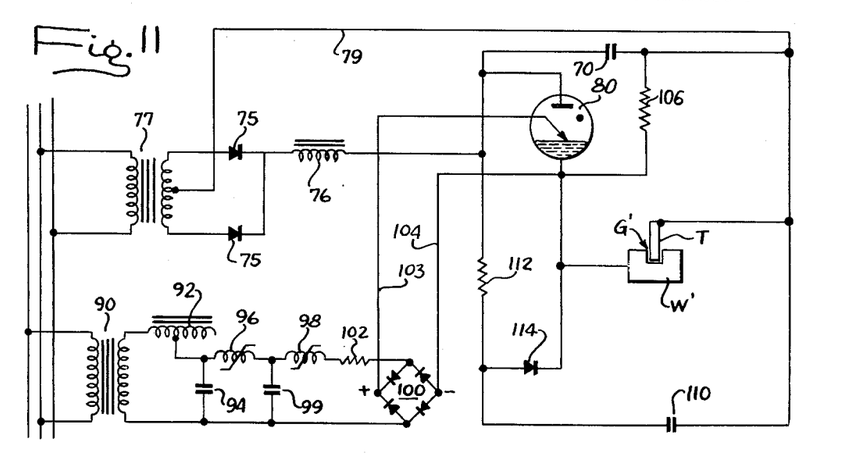
FIG. 11 is a fragmentary schematic circuit diagram of a somewhat modified high-energy spark machining circuit.

In FIG. 11 there is shown a modified circuit which is substantially the same as the circuit shown in FIG. 3 but has included therein a non-inductive gap shunting resistor 106 to provide a parallel path for the oscillatory transient which results from the inherent inductance of the discharge circuit. In order to simplify illustration, the machine operating control circuit, hereinafter to be described, including such elements as relays 125, 135 and 140 have been omitted from FIG. 11 and the rectifier 114 has been shown as a simple single cell device. Further, since this circuit is intended primarily for use in the performance of an inside machining operation the workpiece 75 has been illustrated simply as a conductive block, generally designated W', and the electrode-tool T has been illustrated as a simple rod. The tool T and the work W' are shown in superimposed relation defining a spark-gap G' between them. For a more complete description of such an apparatus reference is made to United States Patent No. 2,730,602 granted January 10, 1956. It will be understood of course that in such an apparatus a fluid dielectric is continuously maintained in the spark-gap G' as, for example, by immersing the tool and work in a bath of liquid dielectric.

Desirably the gap shunting resistor 106 is substantially non-inductive so as to maintain inherent discharge circuit inductance at a minimum. Preferably the resistor 106 has its terminals connected as closely as possible to the cathode terminal of the ignitron and the gap-side terminal of the capacitive storage means 70 and the physical lengths of the interconnecting conductors are minimized.

In operation when the ignitron 80 is made conductive, the capacitive storage means 70 discharges therethrough. The discharge voltage then appears not only at the gap G' but at the resistor 106 as well. However, since the discharge voltage is sufficient to cause sparkover, sparkover occurs and the gap G' presents substantially less resistance than that presented by the resistor 106. Thus while there may be some initial current flow through the resistor 106, when spark-over occurs across the gap G' the majority of current flow will take place across the gap. Subsequently, however, i.e., after the discharge of the capacitive storage means 70, the discharge circuit voltage drops below that necessary to maintain conduction across the gap. This condition obtains by the time the negative "tail" or half cycle (FIG. 10) is manifested, and there is presented as a path for the negative half cycle only the resistor 106. Therefore, the value of the current in the negative half cycle taken with the value of the resistance of the resistor 106 results in substantial dissipation of the energy included in the negative "tail," and it is thus effectively damped. This energy dissipation will be manifested by a heating of the resistor 106, and means for removing this heat may be provided in the form of liquid cooling, for example, of the resistor 106.

It will be apparent from the foregoing that the resistor 106 provides a path across the capacitive storage means 70 and the ignitron 80 which is parallel to the path that includes the spark-gap G' and in which there will be dissipated the energy caused by discharge current flow in the inductive reactance of the discharge circuit. As a practical matter it is substantially impossible to prevent a small amount of reverse charge from appearing on the capacitive storage means 70, but the gap shunting resistor 106 in this form of the invention is so chosen as to provide a division of current flow at a reasonable value consistent with practical commercial design.

There is still another possible solution to this problem which has been found to be practical. In connection with the description of the circuit illustrated in FIG. 3 it was pointed out that alternating current resonant charging of the capacitive storage means 70 is employed and charging is the result of the resonant frequency of the inductance charging choke 76 and the capacitance of the capacitive storage means 70, the values thereof being selected to effect substantial completion of charging approximately 160° after the start of a charging cycle. It was further pointed out that the keying circuit was so designed to provide a keying pulse to render the ignitron 80 conductive at approximately 20 electrical degrees before each source voltage zero or crossover. This is of course approximately 160° after the start of a charging cycle. In other words the ignitron is rendered conductive so as to complete the discharge path for the capacitive storage means at or about the time charging thereof is substantially complete. Thus there can be maximum energy transfer in the spark-discharge across the gap G.

It is, as hereinbefore noted, the result of the rapid discharge that a voltage, $$e = L\frac{di}{dt}$$

is manifested in the discharge circuit and in a direction and of a sign opposite to that of the charging voltage that produces the oscillatory transient. It will be apparent that by properly adjusting the values of the inductance 92 and capacitance 94 of the phase shifting stage of the keying circuit the keying circuit can be made to deliver a keying pulse to render the ignitron conductive at an earlier time. If this is done, then there can be effected discharge of the capacitive storage means 70 and the manifestation of the resulting negative portion of the transient at a time well before the charging voltage from the rectifier 75 and charging choke 76 reaches zero. Thus, the charging voltage from the rectifier 75 and charging choke 76 is still being applied and in a direction opposite to the voltage from the discharge circuit. As a result the latter voltage is substantially nullified. By way of example, laboratory tests have shown that if the phase shift stage of the keying circuit is adjusted so that a keying pulse is applied to the ignitron 80 to render the same conductive at approximately 145° after charging voltage zero, then the average voltage charge on the capacitive storage means 70 was approximately 285 volts. It is apparent, therefore, that the negative portion of the voltage developed in the discharge circuit after firing of the ignitron is compensated. Under these circumstances, laboratory observation also indicated metal removal from a workpiece at an approximate rate of .004 cubic inch per minute.

From the foregoing it will be seen that there is considerable advantage as regards the rate of metal removal from a workpiece that is gained in situations where machining of the electrode-tool is not a critical problem, as in devices such as the illustrative offhand tool sharpener, by not compensating for the negative charge in the capacitive storage means manifested as a result of the effect of the inductive reactance of the discharge circuit nor providing a parallel path therefor. On the other hand where it is desirable to maintain at a minimum erosion of the electrode-tool, as in internal spark machining operations, polarity reversal between the tool and the workpiece can be substantially eliminated either by compensation through earlier firing of the ignitron or by the provision of a parallel energy dissipating path.

As hereinbefore noted, the present invention also contemplates provision for effecting relatively lower energy spark discharges across the gap G but at a substantially higher repetition rate for imparting a relatively fine finish to the work. For this purpose there is included in the illustrative device a circuit of modified relaxation type which includes capacitive storage means 110 which is adapted to be charged from the same alternating current resonant charging source. In this instance the A.C. resonant charging source functions as an inductive input, single section filter. The capacitive storage means 110 is resistance-capacitance charged through a resistor 112 from capacitive storage means 70. The capacitive storage means 110 is relatively small as compared to the capacitive storage means 70, and it is connected between the conductors 71 and 72 of the spark machining mains. In the present instance the capacitive storage means 110 may be on the order of four microfarads, as compared to 300 microfarads for the means 70. In operation the capactive storage means 110 is charged from the source 75, 76, and the effect of the capacitive storage means 70 thereon is to smooth any ripple appearing on the voltage applied to the relaxation circuit from the inductance 76 since the means 70 remains connected.

The charge on the capacitor 110 would eventually approach the voltage of the source unless the spark gap G were maintained with a small enough spacing to assure spark-over or disruptive breakdown at or below the level of the source voltage. Upon spark-over the capacitive storage means 110 discharges through a discharge circuit which includes the main 71, the conductor 83, terminal block 84, lead 86, to the workpiece W and thence across the gap G. From the other side of the gap G the discharge path for the capacitive storage means 110 includes the electrode-wheel 26, the conductor 58, and the other spark-machining main 72. Due to inherent distributed inductance of the discharge circuit the discharge circuit tends to oscillate. While this inherent distributed inductance is desirably made as small as possible, the rate of current flow which upon discharge of the capacitive storage means 110 is of such large amplitude that momentarily stored inductive energy in this instance, too, cannot be considered to be negligible. Thus, there is included in the discharge path a half wave rectifier 114, having a high current rating, to permit the discharge current to flow in the normal direction but to eliminate negative half cycles. As shown the half wave rectifier 114 is made up of four germanium rectifiers connected so that all eight cells thereof are in parallel. It will be apparent therefore that the rectifier 114 is effective to maintain the electrode to work current flow in the proper direction. This minimizes electrode erosion holding the same to what might be termed normal cathode phenomena. Additionally by its preventing a transient oscillatory current from flowing in the series circuit which includes the spark gap G and the capacitive storage means 110, the operation of the relaxation circuit is enhanced, and increased repetition rates are possible without initiating continuous conduction across the working spark gap G.

As shown the peak current in this circuit is of the order of 290 amperes while the average current in the circuit is of the order of two amperes, when a repetition rate as determined by the RC constant of the circuit is such as to effect a repetition rate of approximately 12 kilocycles per second. The average gap voltage is of the order of 70 volts.

Desirably the workpiece W is separated from the table 25 by a non-magnetic work holder 113 and the table 25 is connected into the spark machining circuit by way of a current limiting resistor 115. As a practical matter in spark-machining operations with devices of the illustrative type it is highly desirable that workpieces be relatively unencumbered so as to permit ready removal thereof. For example, if the workpiece happens to be a replaceable tip tool or insert it may be necessary to frequently remove it for gauging purposes. The use of a work holder therefore permits the inclusion of the workpiece in the circuit by having the conductor 86 connected to the work holder with the work piece held in place thereon. This arrangement eliminates the need for effecting a connection directly between the workpiece W and the conductor 86. Thus the workpiece is free to be moved without necessity for disconnecting the conductor 86. It will also be apparent that the table 25 must assume a potential substantially equal to that of the workpiece W which rests thereon so that there is substantially no gradient therebetween. Thus there will be eliminated any "machining" of the work holder 113, as might occur if a gradient did exist, and any danger of imparting an electrical shock to an operator using the device is eliminated. At the same time a lower resistance path from the discharge line 82 to the workpiece is desirable so that the majority of current flow will be by way of the conductor 86, work holder 113, and the workpiece W to the gap G. These are the functions of the current limiting resistor 115 which is interposed between the insulated terminal block 84 and the table 25. The fashioning of the work holder 113 of a non-magnetic material such as brass serves to magnetically isolate the workpiece W from the table 25 and thereby prevent magnetic seizure from occurring between the workpiece W and the table 25 as might result from the high peak current flow through the workpiece.

The schematic circuit diagram shown in FIG. 3 also includes means for controlling the application, alternatively, of the high energy spark discharge from the capacitive storage means 70 and of the relatively lower energy spark discharge from the capacitive storage means 110 across the gap G. This control circuit includes a main switch 120 for the power supply line to the tool. When the switch 120 is closed the primary of a transformer 122 is energized so as to make available an appropriate supply for circuit controlling relays hereinafter to be described. The first of these relays is indicated at 125. The relay 125 includes a set of holding contacts 125a and three sets of power line contacts respectively indicated at 125b, 125c and 125d. Each of these contacts is normally open. When a push-button type "start" switch 126 is operated, the coil of the relay 125 is placed across the secondary of the transformer 122 and the relay 125 is energized, and each of the contacts 125a, 125b, 125c and 125d are closed. It will be appreciated, of course that as soon as the "hold" contacts 125a are closed, the secondary circuit of the transformer 122 is completed through the coil 125 so as to maintain the relay energized.

With the closure of the contacts 125b, 125c and 125d, power is supplied to the primary of the transformer 77 of the charging circuit for the capacitive storage means 70 and 110. Further, power is applied by way of conductors 128 to the motor 40.

A three-position selector switch is provided in the control circuit which in one position is operative to effect application of high energy discharge from the capacitive storage means 70 across the gap G; which in another position is effective to apply the relatively lower energy discharge from the capacitive storage means 110 across the gap G; which in its third position is effective to interrupt the application of spark discharge from either source. This switch is indicated generally at 130 and as shown is of the three-deck, gang type having its movable elements, respectively designated 131a, 132a, and 133a, mechanically connected so that they are movable together. As shown in FIG. 3, the fixed switch elements of each of the decks include three positions respectively designated 131b, 131c and 131d; 132b, 132c, and 132d; and 133b, 133c and 133d. Upon operation of the switch 130 so as to complete a circuit from the movable elements 131a 132a and 133a through the fixed elements 131b, 132b, 133b, respectively, it will be seen that a circuit is completed through the 131 deck only, and the coil of a relay 135 is placed across the secondary of the transformer 122. The relay 135 is provided with a pair of normally open contacts 135a and 135b which are respectively included in each side of the secondary circuit of the transformer 77. Thus, when the relay 135 is energized, upon operation of the switch 130, the full wave rectifier charging circuit is completed.

Upon operation of the switch 130 so that contact is made between the movable elements 131a, 132a and 133a and the fixed contacts 131d, 132d and 133d, it will be seen that the relay 135 continues to be energized by way of contact between the deck elements 132a and 132d even though the deck elements 131c and 131d are open in this position of the switch. In this latter position of the switch 130, the contacts 135a and 135b of the relay 135 are maintained in closed condition, and therefore the capacitive storage means charging circuit is maintained operative.

Upon completion of the circuit between the switch elements 133a and 133d, the coil of a relay 140 is placed across the secondary circuit of the transformer 122. The relay 140 has a pair of normally closed contacts 140a and a pair of normally open contacts 140b. The normally open contacts as shown are included in the power supply to the primary of the transformer 90 of the ignitron keyer circuit so that upon energizing the relay 140 the power supply to the keyer circuit for the ignitron is interrupted. As a result no keying pulse is effected for application to the ignitron 80 and therefore the ignitron remains non-conducting. The relay contacts 140b are included in the discharge circuit of the relatively low energy capacitive storage means 110. Upon energizing the relay 140 this discharge circuit is completed.

The fixed switch elements 131c, 132c and 133c, as shown, remain unconnected and therefore when the switch is operated so that contact therewith is made respectively by the movable switch elements 131a, 132a and 133a, a standby or "ready" condition is defined.

For emergency purposes the secondary circuit of the transformer 122 is provided with a normally closed switch 145 in series with the secondary circuit of the transformer 122. This switch might be termed the "red button" stop switch, for it will be apparent that operating the same will serve to interrupt the secondary circuit momentarily and thus deenergize the relay 125 so that its contacts 125a are opened and the relay is no longer "held in." When the relay 125 is deenergized not only are its contacts 125a opened, but also its contacts 125b, 125c and 125d are opened. Thus the power supply not only in the relay energizing circuit but also in the charging circuit and in the supply circuit for the wheel motor is interrupted. Effectively therefore the entire operation of the machine is stopped.

As hereinbefore noted, it is essential to effective spark machining operation that the gap G be maintained between the electrode-wheel and the workpiece W. A fluid or semisolid, usually a hydrocarbon, having dielectric properties is usually maintained in the gap between the electrode-wheel and the workpiece and is necessary to obtain the short, high current sparks which have been found effective for practical machining rates and to avoid ineffective sparking or prolonged heating arcs which could occur in air. In addition the fluid or semisolid dielectric, which is necessarily self-restoring after each discharge, also entrains the small removed particles and helps carry them away. The illustrative embodiment of the present invention comprises an external or outside spark machining device. With such devices dielectric materials essential to the spark machining apparatus in liquid state are difficult to retain on the electrode-wheel. While continuous liquid feed systems and guards may be added, with liquids a spray is generated and at the spark cutting region, where maximum sight is desired, sight may be obscured not only by the spray but by ripples or waves of liquid which would tend to flow across the surface of the wheel. Furthermore, with liquids considerable splatter is experienced. Therefore, in the present device it is intended that a fluid dielectric in a semisolid or plastic state be employed so that the disadvantages of the liquid or vapor states are avoided. One material found particularly suitable for this purpose is a semisolid petrolatum which is a microcrystalline petroleum wax. This permits of application to the electrode-wheel simply by wiping it across the face of the rotating electrode-wheel. It has been found that only a small amount of this material is required to adequately film the electrode-wheel surface. Due to the normally semi-solid condition of the wax, the electrode-wheel does not have to be heated in order to apply the wax nor does the wax run off the wheel in operation. The use of dielectric material of this sort is disclosed in the copending application of Cecil Paul Porterfield, Serial Number 531,327, filed August 30, 1955, and assigned to the same assignee as the present application.

In the operation of the illustrative offhand tool sharpener there is one precaution that might be noted. The electrode-wheel 26 should be rotated at a speed which is non-synchronous with respect to the spark repetition rate. The purpose of this is to insure against consecutive spark discharges occurring at the same place on the wheel surface. If this should occur it is possible for the wheel surface to become pitted or the dielectric to be removed at such a point of repeated spark discharge. Both of these would adversely affect spark machining of a workpiece. It will be apparent, however, that the use of any conventional form of non-synchronous motor for driving the electrode-wheel satisfies this precaution since in the present spark machining device the spark repetition rate is related to the source frequency.

In describing the first illustrative embodiment of the presnt invention it was assumed that operation would be effected from conventional power mains providing an alternating supply at a relatively low frequency such, for example, as 60 cycles per second. In discussing the operation of that embodiment it has been pointed out that with the high energy spark discharge circuit that the capacitive storage means 70 was fully charged, was discharged, and a waiting period was provided to allow deionization of the ignitron all within the time taken for one positive half cycle of the full wave rectified voltage from the charging circuit 75, 76. It was also noted that from the observation of a large number of commercially available ignitrons that a waiting time for deionization thereof amounting to some 500 microseconds was desirable at the energy levels here contemplated. From this it will be seen that there are two factors to be taken into consideration to operate from an alternating source a spark machining apparatus fashioned according to the teaching of the present invention: First, it is desirable that the capacitive storage means be allowed to become fully charged and discharged within the time available for one operational cycle in order to provide maximum energy transfer across the spark gap G. Additionally the ignitron which, when it is made conductive completes the discharge circuit for the capacitive storage means, must be allowed ample time to deionize after discharge of the capacitive storage means and thereby reestablish the discharge circuit in nonconductive condition for the next cycle of operation.

The form of the invention shown in FIG. 12 is intended to make provision for operation at frequencies substantially higher than those contemplated for the operation of the previously described embodiments. It will be apparent, however, as the description proceeds that this embodiment permits of operation from lower frequency sources as well. Referring more particularly to FIG. 12, it will be noted that for purposes of simplicity of illustration the control components such as the relays 125, 135 and 140 have been omitted, that the spark-gap G has been diagrammatically represented by two oppositely facing arrow points. Further, since no change either in form or operation is contemplated in the relaxation circuit portion of the device, it too has been omitted from this drawing.

This embodiment of the present invention includes two high energy spark machining circuits which are arranged to be alternately charged and fired across the gap G. Each of these circuits includes a half wave rectifier, a charging inductance, capacitive storage means, an ignitron, and the gap G. These components are so arranged that alternative half cycles of the source voltage are utilized for charging the respective capacitive storage means. After charging, the capacitive storage means are discharged across the gap by alternately keying the respective ones of the ignitrons. Since the succeeding half cycle of the alternating source is used for charging the capacitive storage means of the other circuit, during the time which this occurs zero voltage occurs in the one circuit. As a result, the ignitron of the one circuit is allowed time to deionize so as to reestablish non-conductive condition thereof and thereby ready the one circuit for the next succeeding half cycle from the alternating source.

Referring more particularly to the drawing it will be seen that a transformer 177 is utilized to derive a charging voltage from the power source. The transformer 177 has a center-tapped secondary. One end of the secondary is connected to a half wave rectifier 175A and the output thereof is applied to a charging inductance 176A in such manner that unidirectional positive potential is supplied to the conductor 171A of the spark machining mains 171A, 172. Across the spark machining mains is connected the capacitive storage means 170A. The main 172 is connected back to the center tap of the secondary winding of the transformer 177 by the line 179, thus completing the first of the two charging circuits. The discharge circuit for the capacitive storage means 170A includes an ignitron 180A and the spark gap G, the latter being appropriately shunted by a damping resistor 206. The ignitron and the gap are arranged in a series circuit which is interposed between the spark machining mains 171A and 172.

To the other end of the secondary of the transformer 177 is connected a second half wave rectifier 175B. In series therewith is a charging inductance 176B. This is utilized as the charging source to supply a unidirectional potential to the conductor 171B of the spark machining mains 171B, 172. Between these spark machining mains is connected the capacitive storage means 170B. The discharge circuit for the capacitive storage means 170B includes in a series circuit the ignitron 180B and the spark gap G with its shunting resistor 206. This discharge circuit is completed by the connection of the other side of the spark gap, as before, to the spark machining main 172.

Figure 13:
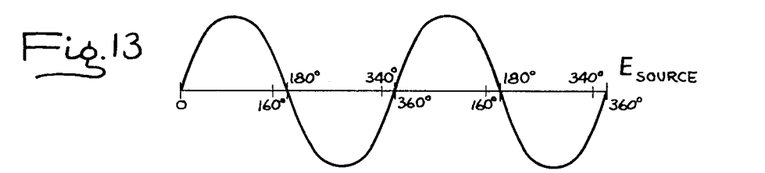
Figures 14, 15, 16:
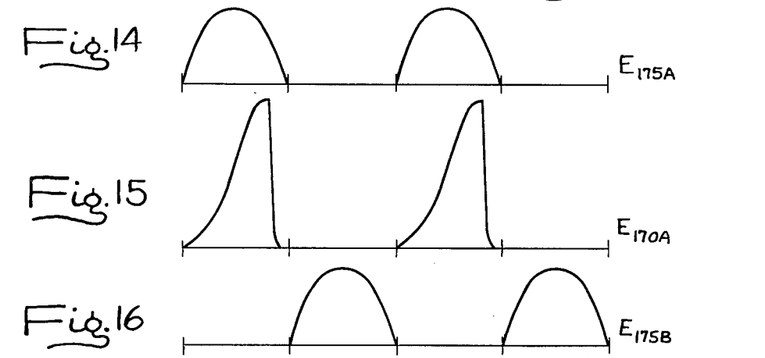
FIG. 14 is representative of the half wave rectified voltage from tht rectifier 175A.
FIG. 15 is representative of the voltage of the capacitive storage means 170A.
FIG. 16 is representative of the output of the half wave rectifier 175B.

Assuming a uniform, sinusoidal supply voltage the same wave form will appear across the secondary of the transformer 177 as shown in FIG. 13. This alternating voltage is rectified by the half wave rectifiers 175A and 175B and the outputs thereof comprise a series of spaced unidirectional positive half cycles. These are shown in FIGS. 14 and 16, respectively. Thus, when a positive half cycle is applied from the charging circuit 175A, 176A, there will be zero voltage applied from the charging circuit 175B, 176B. Alternately when a positive half cycle is supplied from the charging circuit 175B, 176B zero voltage is supplied by the charging circuit 175A, 176A.

Figure 17:
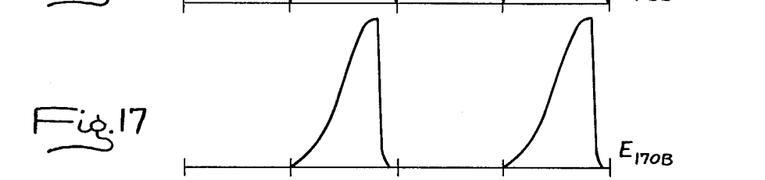
FIG. 17 is representative of the voltage of the capacitive storage means 170B.
Figure 18:
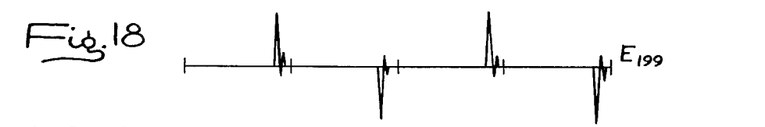
FIG. 18 is representative of the voltage applied to the second stage capacitor of the keying circuit shown in FIG. 12 and is labeled $E_{199}$.

As with the first form of the invention illustrated and described, with this form means is also provided for relating the repetition rate of the spark discharges from the capacitive storage means 170A and 170B across the gap G to the frequency of the alternating electrical power supply. More particularly, the ignitrons 180A and 180B are continuously connected to a unidirectional periodic power source and the circuit is so arranged that the ignitrons are made conducting so as to alternately discharge the capacitive storage means 170A and 170B and to again become non-conducting prior to the arrival of the next cycle from their respective charging circuits. Thus, at the beginning of a cycle from the respective charging circuits, the ignitrons are respectively maintained non-conductive so that the capacitive storage means 170A and 170B are charged; the igniters are then alternately made conductive so as to effect discharge of the capacitive storage means; and then the ignitrons are allowed to deionize by the absence of the positive half-cycle so as to return to non-conductive condition prior to the beginning of the next cycle from the periodic power source. Referring to FIGS. 14 and 16 it wil be seen that as applied to each of the spark initiating circuits the half wave rectified output from the respective charging circuits 175A, 176A and 175B, 176B are unidirectional periodic electromotive forces comprising two series of positive half cycles of a sine wave spaced apart 180 electrical degrees. By way of example, if the alternating supply frequency is 600 cycles per second, there will be a positive half cycle of approximately 830 microseconds duration followed by a period of zero voltage of equal length emanating from each of the charging circuits. The charging of the capacitive storage means 170A and 170B are represented by the wave forms shown in FIGS. 15 and 17, respectively. As shown, the charging rate of each of the capacitive storage means increases with the increase in the voltage from the respective charging circuit but does not decrease to zero when the voltage charge equals the voltage of the source, but instead the respective charging chokes 176A and 176B tend to prevent current change by the collapsing of their respective fields, i.e., discharging the energy stored therein. The cumulative voltage of both the sources and the stored charges as a result of the effect of the inductances of the respective charging chokes 176A and 176B is substantially twice the source voltages as hereinbefore explained in connection with the first form of the invention illustrated.

In order to effectively charge and discharge the capacitive storage means 170A and 170B, the ignitrons 180A and 180B are rendered conductive substantially at the end of the respective charging cycles, thus allowing the capacitive storage means to acquire a maximum charge and then to discharge across the spark gap. Thereafter during the time when zero voltage is supplied from the charging circuits the ignitrons are allowed time to deionize and thus reestablish a non-conducting condition thereof prior to the arrival of the next positive voltage swing so that the respective capacitive storage means are again recharged. In the example begun above, it will be noted that the time of zero voltage supply from the respective charging circuits amounts to approximately 830 microseconds. Since, as hereinbefore noted, observation of a large number of commercially available ignitrons has demonstrated that an ample time for ignitron deionization is 500 microseconds at the energy levels here involved, it will be seen that this period of zero voltage provides more than ample time for ignitron deionization. Furthermore, there is also provided an ample time allowance for the discharge of the respective capacitive storage means 170A and 170B.

In order to render the ignitrons conductive in proper time relation to the charging of the capacitive storage means, the instant embodiment employs a keying circuit including a phase shifting and peaking network to provide alternate positive energy pulses between the igniters and cathodes of the ignitrons 180A and 180B. As shown, the keying circuit includes an isolation transformer 190 having its primary connected to the power supply line and its secondary applied to a phase shifting and peaking network. More particularly, the phase shift network of the keying circuit includes an inductance or charging choke 192 and a capacitor 194. This may be termed the first stage of the keying circuit and is the pulse initiating and timing stage. The charging choke 192 together with the leakage inductance of the transformer 190 when associated with the capacitor 194 produces a voltage wave form such as that shown in solid line in FIG. 5. The second and third stages of the illustrative keying circuit consist of saturable inductances 196 and 198 and a capacitor 199 which stages may be aptly termed the pulse compression stages and result in the production of short high energy pulses. The voltage which appears across the isolation transformer 190 is in exact time phase relation with the supply voltage with the result that there is produced at the end of the keying circuit network a series of positive and negative pulses which are exactly timed with relation to the positive half cycles that were derived from the supply voltage by the charging circuits 175A, 176A and 175B, 176B. The positive pulses appearing at the end of the keying circuit are applied by way of leads 203A and 204A between the igniter and cathode of the ignitron 180A, these lines including isolation diodes 200A and 200A' so as to pass only the positive pulses and reject the negative pulses. When the negative pulses come along, the upper line of the keying circuit goes substantially more negative than the lower line thereof. It will be seen that then the lower line is the more positive line.

Figure 19:
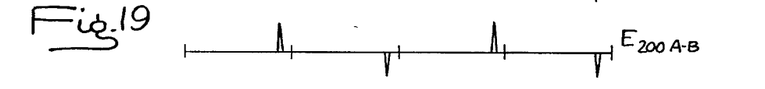
FIG. 19 is representative of the voltage applied to the rectifiers included in the keying circuit illustrated in FIG. 12, and is labeled $E_{200AB}$.
Figure 20:
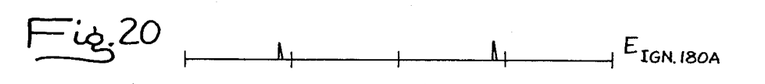
FIGS. 20 and 21 are representative of the voltage pulses applied between the igniters and the cathodes respectively of the ignitrons included in the circuit shown in FIG. 12 and are labeled respectively $E_{Ign.180A}$ and $E_{Ign.180B}$.
Figure 21:
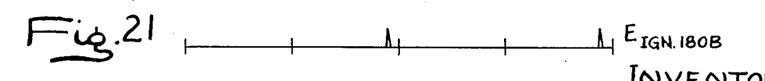

By applying these pulses between the igniter and cathode of the ignitron 180B, this igniter is made positive with respect to this cathode and ionization within the ignitron 180B is effected so as to render the same conductive. Thus the lower line of the keying circuit is connected by way of a line 203B and the isolation diode 200B to the igniter of the ignitron 180B, and the upper line of the keying circuit is connected to the cathode of the ignitron 180B by way of a conductor 204B which includes isolation diode 200B'. For purposes of graphic representation of what happens as the pulse proceeds along from stage to stage in the keying circuit FIGS. 18, 19, 20 and 21 have been included in the drawings. FIG. 19 shows the voltage wave form as it appears at the end of the keying circuit, across the upper and lower lines thereof, and FIGS. 20 and 21 show the voltage wave forms as they appear between the lines 203A, 204A and 203B, 204B, respectively. These wave forms have been shown in substantially the same scale for purposes of comparison and from them it will be seen that the ignitrons are alternately fired and in appropriate relation to the charging voltages which are derived respectively from the charging circuits 175A, 176A and 175B, 176B.

From the foregoing it will be appreciated that the operation of the spark initiating circuits including the capacitive storage means 170A and 170B and the initiation of the pulses in the keying circuit to render the ignitrons 180A and 180B are directly related to the supply line frequency. It will be apparent that the repetition rate of the spark discharges across the gap G as derived from these circuits is also directly related to the supply frequency. It will be further observed that exceedingly high energy spark discharges are applied across the gap G and that this particular construction and arrangement permits utilization of the instant invention with substantially higher supply line frequencies without sacrifice of spark energy.

This application is a continuation-in-part of applicants' copending application Serial Number 579,623, filed April 20, 1956, now Patent No. 2,868,947, granted January 13, 1959.

We claim as our invention:

1. An apparatus for operation from an alternating current source for spark-machining a workpiece by the application of short time-spaced spark-discharges across a gap between the workpiece and an electrode-tool comprising, in combination, capacitive storage means, means for deriving a unidirectional periodic charging voltage for said capacitive storage means from the alternating current source, a discharge circuit for said capacitive storage means including the spark-gap, an ignitron for rendering the circuit alternately non-conducting and conducting to effect alternative charging and discharging of said capacitive storage means, and a keying circuit for said ignitron including means for deriving a keying pulse from the alternating current source in timed relation to the charging voltage applied to said capacitive storage means, said discharge circuit further including a saturable reactor interposed between the electrode-tool and said capacitive storage means, said saturable reactor presenting an unsaturated inductance for preventing a sufficient voltage build-up subsequent to discharge of said capacitive storage means across the gap to cause reverse ignitron induction.

2. An apparatus for operation from an alternating current source for spark-machining a workpiece by the application of short time-spaced spark-discharges across a gap maintained between an electrode-tool and the workpiece comprising, in combination, capacitive storage means, means comprising an A.C. resonant circuit for continuously supplying a periodic unidirectional charging voltage to said capacitive storage means, a discharge circuit for said capacitive storage means including an ignitron, the workpiece, the electrode-tool and a saturable reactor, means for periodically rendering said ignitron conductive to effect discharge of said capacitive storage means across said spark-gap in timed relation to the periodic charging voltage, said saturable reactor effecting a time delay in the conduction of transients manifested in said discharge circuit upon discharge of said capacitive storage across the gap so as to prevent reverse ignitron conduction.

3. An apparatus for operation from an alternating current source for spark-machining a workpiece by the application of short time-spaced spark-discharges thereto, said apparatus comprising, in combination, an electrode-tool, means for supporting the workpiece in closely spaced relation to said tool to define a dielectric-filled spark-gap therebetween, capacitive storage means, a charging circuit including a full-wave rectifier and a charging choke for deriving a unidirectional periodic charging voltage from the alternating source and applying it to said capacitive storage means, a discharge circuit for said capacitive storage means including said spark-gap and an ignitron, and a keying circuit for said ignitron for deriving spaced pulses from the alternating current source for application to said ignitron to render the same conducting in time phased relation to the full-wave rectified charging voltage applied to said capacitive storage means for effecting discharge of said capacitive storage means at substantially peak voltage charge and in advance of a succeeding cycle of the charging voltage to permit said ignitron to become again non-conducting before the start of the succeeding cycle of charging voltage.

4. An apparatus for operation from an alternating current source for spark-machining a workpiece by the application of short time-spaced spark-discharges across a spark-gap maintained between an electrode-tool and the workpiece, said apparatus comprising, in combination, a capacitor, a charging circuit for said capacitor for operation from the alternating current source including a full-wave rectifier and a charging choke in A.C. resonant charging relation with said capacitor for supplying a unidirectional periodic charging voltage thereto, a discharge circuit for said capacitor including the gap, the electrode-tool and including a saturable reactor interposed between the tool and said capacitor, an ignitron, the workpiece, and a keying circuit for said ignitron for deriving spaced pulses from the alternating current source for application to said ignitron to render the same conducting in time phased relation to the charging voltage applied to said capacitive storage means for effecting discharge of said capacitive storage means at substantially peak voltage charge and in advance of a succeeding cycle of the charging voltage to permit said ignitron to become again non-conducting before the start of the succeeding cycle of charging voltage, said saturable reactor presenting an unsaturable inductance sufficient to prevent a voltage build-up in the discharge circuit subsequent to discharge of said capacitive storage means so as to preclude reverse ignitron conduction.

5. An apparatus for operation from an alternating current source for spark-machining a workpiece by the application of short time-spaced spark-discharges thereto across a spark-gap maintained between the workpiece and an electrode-tool, said apparatus comprising, in combination, a pair of capacitive storage elements, a charging circuit including two half-wave rectifiers and charging inductances for deriving unidirectional periodic charging voltages of half-wave rectified form from the alternating source and applying them respectively to said capactive storage elements, a discharge circuit for said capacitive storage elements including an ignitron associated with each of said capacitive storage elements and including said spark-gap, and a keying circuit for deriving spaced pulses from the alternating current source for alternate application to said ignitrons to alternately render the same conductive in time phased relation to the half-wave rectified charging voltages applied to said capacitive storage elements for effecting alternative discharge of said capacitive storage elements at substantially peak voltage charge and in advance of a succeeding cycle of the charging voltage so that deionization of said ignitrons respectively occurs and the ignitrons become non-conducting prior to the start of the succeeding cycle of the charging voltages for each capacitive storage element.

6. An apparatus for spark-machining a workpiece by the application of short time-spaced spark-discharges thereto across a spark-gap maintained between the workpiece and an electrode-tool comprising, in combination, a first spark-discharge initiating circuit including a capacitive storage element, an alternating current resonant charging source for said capacitive storage element, a second spark-discharge initiating circuit including a second capacitive storage element, said alternating current resonant charging source and said first capacitive storage element comprising a constant current supply for charging said second capacitive storage element, a discharge circuit including said spark-gap, and means for alternatively connecting said first and second spark-discharge initiating circuits for effecting discharge of said storage elements through said discharge circuit to effect spark-over current flow across the spark-gap.

7. An apparatus for spark-machining a workpiece by the application of short time-spaced spark-discharges thereto across a spark-gap maintained between the workpiece and an electrode-tool comprising, in combination, a first circuit including a relatively high capacitive storage element and means for periodically discharging said element for initiating high-energy spark-discharges, a second circuit including a relatively low capacitive storage element for initiating low-energy spark-discharges and means for periodically discharging said element, means for charging each of said capacitive storage elements from a power source, a discharge circuit including the spark-gap, and means for alternatively connecting said first and second circuits to said discharge circuit for effecting discharge of said storage elements alternatively therethrough to provide spark-over current flow across the spark-gap from the workpiece to the electrode-tool.

8. An apparatus for spark-machining a workpiece by the application of short time-spaced spark-discharges thereto across a spark-gap maintained between the workpiece and an electrode-tool, said apparatus comprising, in combination, a first spark-discharge initiating circuit including a relatively high capacitive storage element and means for periodically discharging said element at a relatively low repetition rate, a second spark-discharge initiating circuit including a relatively low capacitive storage element and means for periodically discharging said element at a relatively high repetition rate, a charging circuit continuously connected to each of said elements for charging the same from a power source, a discharge circuit including the spark-gap, and means for alternatively connecting said first and second spark-discharge initiating circuits to said discharge circuit for effecting discharge of said capacitive storage elements therethrough upon operation of said discharge means to provide spark-over current flow across the spark-gap from the workpiece to the electrode-tool.

9. An apparatus for connection with an alternating power supply for spark-machining a workpiece by the application of short time-spaced spark-discharges thereto across a spark-gap maintained between an electrode-tool and the workpiece, said apparatus comprising, in combination, a first spark-discharge initiating circuit including a relatively high capacitive storage element and an ignitron connected in series therewith, a keying circuit for deriving energy pulses from the alternating power supply for periodically rendering said ignitron conductive so as to periodically discharge said capacitive storage element at a relatively low repetition rate related to the frequency of the alternating power supply, a second spark-discharge initiating circuit including a relatively low capacitive storage element and means independent of the power supply frequency for periodically discharging said element at a relatively high repetition rate, a charging circuit for deriving a substantially continuous unidirectional charging current from the power supply and supplying the same to each of said capacitive storage elements, a discharge circuit including the spark-gap, and means for alternatively connecting said first and second spark-discharge initiating circuits and said discharge circuit for effecting discharge of said capacitive storage elements therethrough to provide spark-over current flow from the workpiece to the electrode-tool.

10. An apparatus for spark-machining a workpiece by the application of short time-spaced spark-discharges thereto across a gap maintained between the workpiece and an electrode-tool, said apparatus comprising, in combination, a first spark-discharge initiating circuit including a relative high capacitive storage element and an ionizable discharge control device of the low resistance externally-keyed type for periodically discharging said capacitive storage element, a second spark-discharge initiating circuit of the relaxation type including a relatively low capacitive storage element, means for charging said capacitive storage elements from a power source, a discharge circuit including the spark-gap, and means for alternatively connecting said first and second spark-discharge initiating circuits and said discharge circuit for effecting discharge of said capacitive storage elements therethrough to provide spark-over current flow from the workpiece to the electrode-tool.

11. An apparatus for use with an alternating power supply for performing spark-machining operation on a workpiece by the application of short time-spaced spark-discharges across a spark-gap maintained between the workpiece and an electrode-tool, said apparatus comprising, in combination, a first spark-discharge initiating circuit including a relatively high capacitance storage element and an ionizable discharge control device of the low-resistance externally-keyed type for periodically discharging said capacitive storage element, a second spark-discharge initiating circuit of the relaxation type including a relatively low capacitance storage element, means for providing from the power supply a unidirectional periodic charging voltage for the capacitive storage element of said first spark-discharge initiating circuit, said means and the capacitive storage element of said first spark-discharge circuit comprising a constant charging voltage supply for the capacitive storage element of said second spark initiating circuit, a circuit for deriving a keying pulse from said power supply for said discharge device, and means for alternatively connecting said keying circuit to discharge said first capacitive storage element across the spark-gap and for connecting said relaxation circuit with said spark-gap so as to alternatively provide relatively high energy spark-discharges at a relatively low repetition rate between said electrode-tool and the workpiece and relatively low energy spark-discharges at a relatively high repetition rate therebetween.

12. An apparatus for spark machining a conductive workpiece by the application of short time-spaced spark discharges thereto across a spark gap defined by the workpiece and an electrode tool which apparatus comprises, in combination, a capacitive storage means, means for charging a capacitive storage means, an ionizable unidirectionally conductive discharge device having a control electrode for initiating conduction, a saturable reactor for presenting a high impedance to the flow of current therethrough for an interval until the reactor is saturated, a discharge circuit comprising said gaseous discharge switching device and said reactor connected in series with said spark gap across the capacitive storage means, and means for periodically applying a control voltage to said control electrode to render the discharge circuit unidirectionally conductive.

13. An apparatus for spark-machining a workpiece by the application of short time-spaced spark-discharges thereto across a gap between an electrode-tool and the work-piece comprising, in combination, capacitive storage means, means for connecting a unidirectional periodic charging voltage source to said capacitive storage means, a discharge circuit connected across said capacitive storage means including in series connection the spark-gap, a normally open ionizable switch and a saturable reactor, and means for periodically rendering said normally open ionizable switch alternately conductive and non-conductive in timed relation to said periodic charging voltage to effect discharge of the storage means during a charging cycle of the periodic voltage source prior to the initiation of a succeeding charging cycle.

References Cited in the file of this patent
UNITED STATES PATENTS

| | | |
|---|---|---|
| 2,235,385 | Rava | Mar. 18, 1941 |
| 2,308,860 | Clark | Jan. 19, 1943 |
| 2,346,975 | Laboulais | Apr. 18, 1944 |
| 2,359,178 | White | Sept. 26, 1944 |
| 2,359,315 | Klemperer | Oct. 3, 1944 |
| 2,473,915 | Slepian et al. | June 21, 1949 |
| 2,508,115 | Klemperer | May 16, 1950 |
| 2,515,632 | Coffin | July 18, 1950 |
| 2,568,464 | Rogers | Sept. 18, 1951 |
| 2,773,168 | Williams | Dec. 4, 1956 |
| 2,835,784 | Williams | May 20, 1958 |
| 2,835,785 | Williams | May 20, 1958 |